United States Patent
Todoroki (10) Patent No.: US 6,996,185 B2
(45) Date of Patent: Feb. 7, 2006

(54) IMAGE SIGNAL DECODING APPARATUS

(75) Inventor: Akinari Todoroki, Hachioji (JP)

(73) Assignee: Seiko Epson Corporation, Tokyo (JP)

( * ) Notice: Subject to any disclaimer, the term of this patent is extended or adjusted under 35 U.S.C. 154(b) by 679 days.

(21) Appl. No.: 10/067,346

(22) Filed: Feb. 7, 2002

(65) Prior Publication Data

US 2002/0114396 A1 Aug. 22, 2002

(30) Foreign Application Priority Data

Feb. 22, 2001 (JP) ............................. 2001-046094

(51) Int. Cl.
*H04N 7/12* (2006.01)
(52) U.S. Cl. ............................. 375/240.29; 375/240.16
(58) Field of Classification Search ........... 375/240.29, 375/240.01, 240.16, 240.26
See application file for complete search history.

(56) References Cited

U.S. PATENT DOCUMENTS

| | | | |
|---|---|---|---|
| 5,699,128 A * | 12/1997 | Hayashi ...................... | 348/699 |
| 5,912,676 A * | 6/1999 | Malladi et al. ............. | 345/531 |
| 6,061,402 A * | 5/2000 | Boyce et al. ................ | 375/240 |
| 6,310,921 B1 * | 10/2001 | Yoshioka et al. ......... | 375/240.26 |
| 6,373,893 B1 * | 4/2002 | Midorikawa ........... | 375/240.16 |
| 6,385,248 B1 * | 5/2002 | Pearlstein et al. ...... | 375/240.25 |
| 6,493,391 B1 * | 12/2002 | Komori et al. ......... | 375/240.25 |

FOREIGN PATENT DOCUMENTS

JP   A 6-205395   7/1994

* cited by examiner

*Primary Examiner*—Mehrdad Dastouri
*Assistant Examiner*—Patrick Cathey, II
(74) *Attorney, Agent, or Firm*—Oliff & Berridge, PLC (57) ABSTRACT

To decrease costs in decoding a digital image signal. An image signal decoding apparatus stores forward reference frame data to be used for a decoding process in frame memories of a main memory provided in a common division, and also stores the frame data highly likely to be used for a motion compensation process in a motion compensation memory provided in a decoding processing division. Accordingly, it is possible, by sharing the main memory, to decrease manufacturing costs of the image signal decoding apparatus compared with the cases of providing dedicated frame memories for storing a current frame data and a forward reference frame data inside the decoding processing division respectively. In addition, it is possible to reduce power consumption during a decoding process compared with the cases of providing the dedicated frame memories.

3 Claims, 10 Drawing Sheets

IMAGE SIGNAL DECODING APPARATUS

BACKGROUND OF THE INVENTION

1. Field of the Invention

The present invention relates to a digital image signal decoding apparatus having a frame memory for motion compensation.

2. Description of the Related Art

In the past, as for the apparatus for decoding a digital image such as MPEG (Motion Picture Experts Group)-4, an image signal decoding apparatus having a frame memory for performing motion compensation was known.

Figure 11:
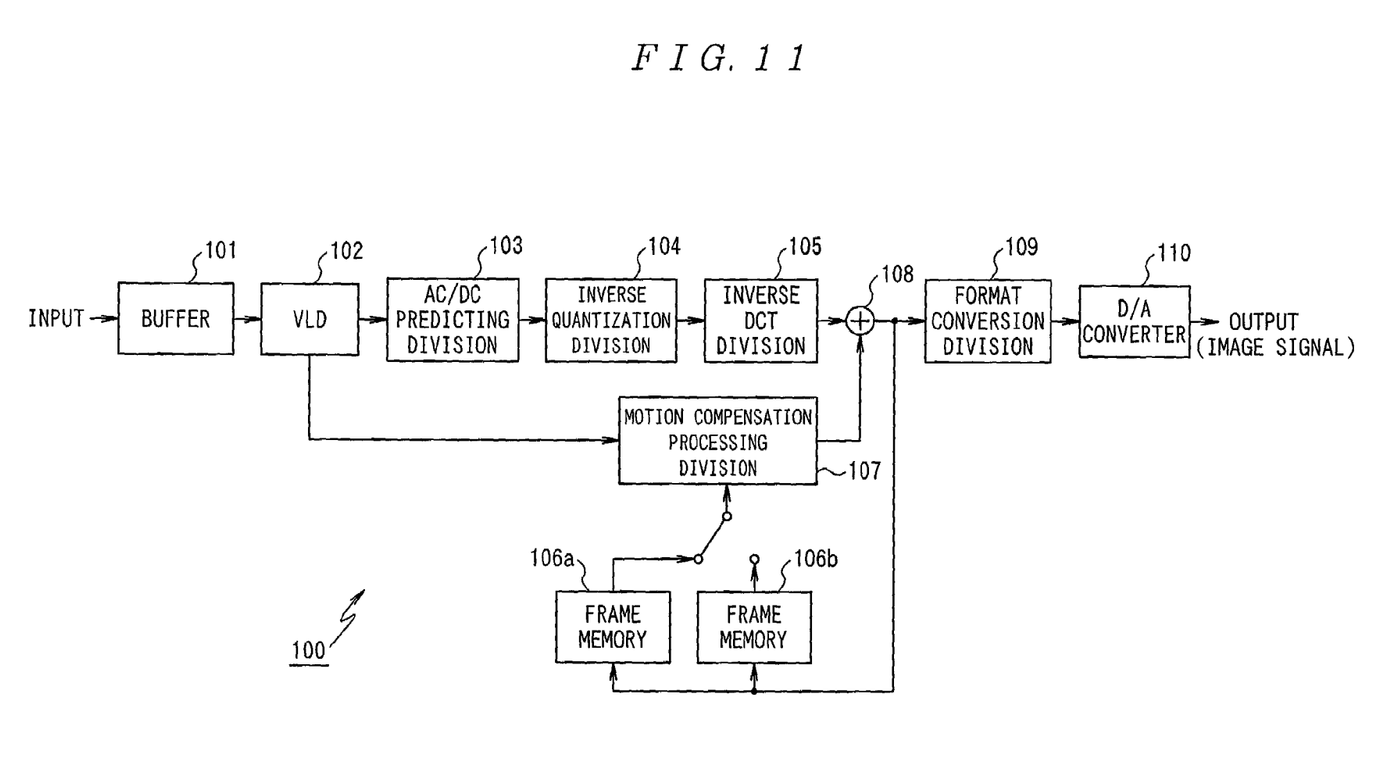
FIG. 11 is a diagram showing a configuration of an image signal decoding apparatus 100 used in the past.

FIG. 11 is a diagram showing a configuration of an image signal decoding apparatus 100 used in the past. In FIG. 11, the image signal decoding apparatus 100 includes and is comprised of a buffer 101, a variable length decoding division (hereafter, referred to as "VLD") 102, an AC/DC (Alternating Current or Direct Current) predicting division 103, an inverse quantization division 104, an inverse DCT (Discrete Cosine Transform) division 105, a frame memories 106a and 106b, a motion compensation processing division 107, an adder 108, a format conversion division 109 and a D/A (Digital to Analog) converter 110.

The buffer 101 temporarily stores data included in an input signal and outputs it to the VLD 102.

The VLD 102 decodes in variable length the data inputted from the buffer 101, and outputs the decoded data (hereafter, referred to as "variable length decoded data") to the AC/DC predicting division 103 and the motion compensation processing division 107.

The AC/DC predicting division 103 predicts AC and DC components of the variable length decoded data inputted from the VLD 102 between or inside the frames, and outputs predictive data (hereafter, referred to as "predictive data") to the inverse quantization division 104.

The inverse quantization division 104 inversely quantizes the predictive data inputted from the AC/DC predicting division 103, and outputs inversely quantized data (hereafter, referred to as "inversely quantized data") to the inverse DCT division 105.

The inverse DCT division 105 performs inverse discrete cosine transform to the inversely quantized data inputted from the inverse quantization division 104, and outputs transformed data (hereafter, referred to as "inverse DCT data") to the adder 108.

As for the frame memories 106a and 106b, one of them stores frame data of a frame immediately preceding the currently decoded frame (hereafter, referred to as "forward reference frame data"), and the other stores the frame data of the currently decoded frame (hereafter, referred to as "current frame data") according to an instruction of the motion compensation processing division 107. These two frame memories have the frame data processed by the decoding apparatus 100 alternately stored frame by frame. And then, of the frame data stored in the frame memories 106a and 106b, the forward reference frame data is outputted to the motion compensation processing division 107 to be used for the motion compensation processing.

The motion compensation processing division 107 performs the motion compensation process by macro blocks based on the forward reference frame data stored in one of the frame memories 106a and 106b and the variable length decoded data inputted from the VLD 102, and outputs processing results (hereafter, referred to as "motion compensation data") to the adder 108. In addition, the motion compensation processing division 107 outputs an instruction signal to the frame memories 106a and 106b to have each frame memory store the current frame data or store the forward reference frame data to be used for the motion compensation process each time one frame is processed.

The adder 108 adds the inverse DCT data inputted from the inverse DCT division 105 to the motion compensation data inputted from the motion compensation processing division 107, and outputs addition results to the format conversion division 109. In addition, the adder 108 outputs the addition results to the frame memory, of the frame memories 106a and 106b, which is supposed to store the processing results of the current frame data according to the motion compensation processing division 107.

The format conversion division 109 converts the addition results inputted from the adder 108 into a predetermined data format, and outputs it to the D/A converter 110.

The D/A converter 110 D/A-converts the data in the predetermined format inputted from the format conversion division 109, and outputs it as an analog image signal.

As the above-mentioned decoding apparatus 100 refers to the forward reference frame when performing the motion compensation process, it has, for the sake of constantly storing the forward reference frame data, two frame memories provided therein, that is, one for storing the forward reference frame data and the other for storing the current frame data.

Here, as the frame memories used for decoding image signals need to have a high speed, a high-speed device such as an SRAM (Static Random Access Memory) of a short access time is used. Accordingly, in the case of having two frame memories, the image signal decoding apparatus requires high cost. In addition, in the case of performing the motion compensation process while having two frame memories, it consumes large amounts of electric power in order to store the frame data in the frame memories.

To solve these problems, Japanese Patent Laid-Open No. 6-205395 or the like discloses the image signal decoding apparatus having one frame memory, a FIFO (First In First Out)-type memory and a memory controller for controlling them.

Figure 12:
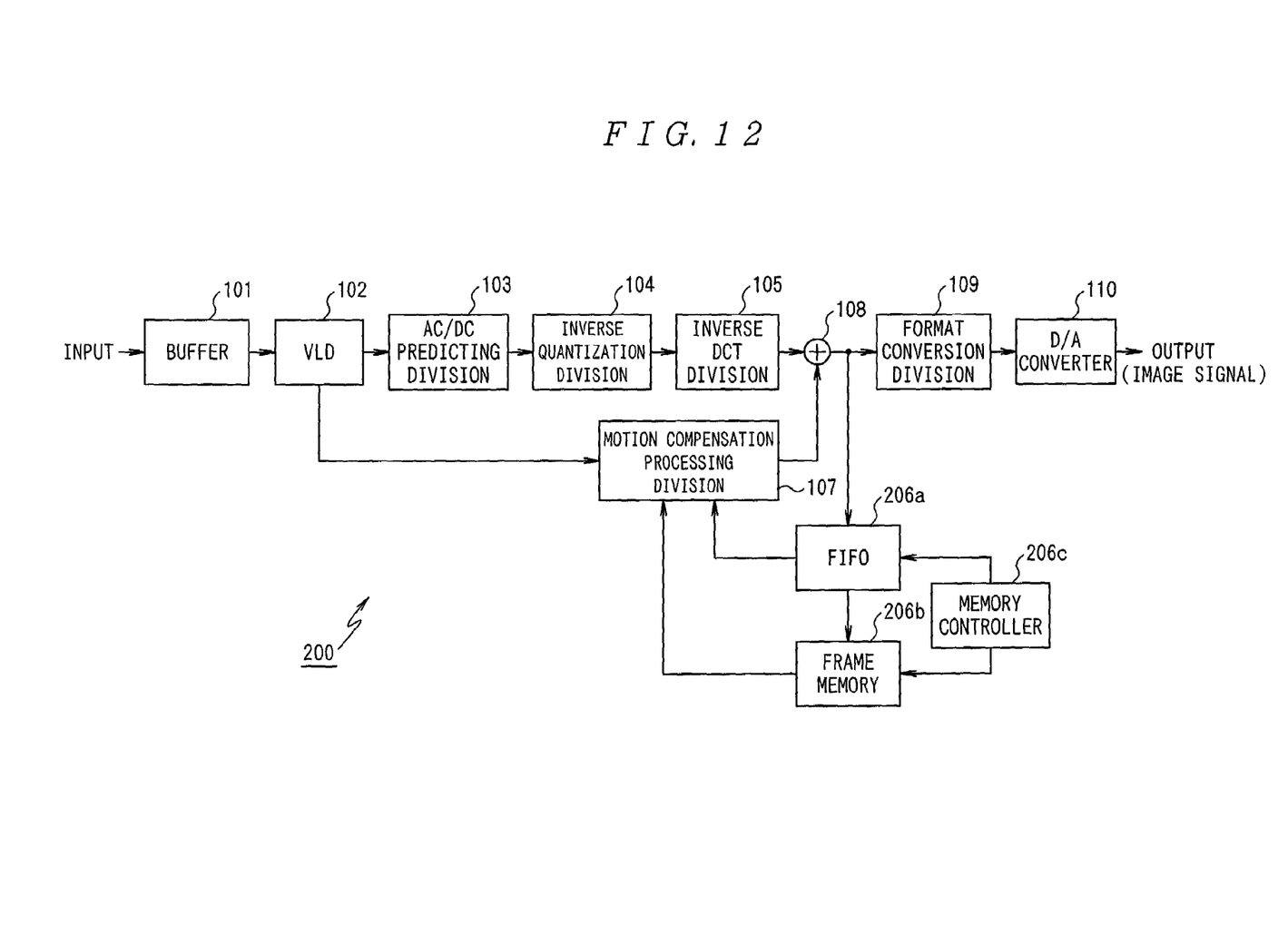
FIG. 12 is a diagram showing an example of a configuration of an image signal decoding apparatus 200 having a FIFO-type memory.

FIG. 12 is a diagram showing an example of the configuration of an image signal decoding apparatus 200 having the FIFO-type memory. In FIG. 12, the image signal decoding apparatus 200 has a FIFO-type memory 206a, a frame memory 206b and a memory controller 206c instead of the frame memories 106a and 106b of the image signal decoding apparatus 100. As for the image signal decoding apparatus 200 shown in FIG. 12, the portions other than the FIFO-type memory 206a, frame memory 206b and memory controller 206c are the same as those of the image signal decoding apparatus 100 shown in FIG. 11 so that they are numbered likewise and description thereof is omitted. In addition, it will be described hereafter by referring to the description of the portions that are the same as and corresponding to those of the image signal decoding apparatus 100.

In FIG. 12, the FIFO-type memory 206a stores the addition results of the adder 108, and outputs them to the frame memory 206b in order of input in predetermined timing. In addition, in the case where the motion compensation processing division 107 performs the motion compensation process, the FIFO-type memory 206a outputs the predetermined data used for the motion compensation, of the frame data that is stored, to the motion compensation processing division 107. Moreover, the FIFO-type memory 206a stores eight slices in the image of one frame, where a "slice" is comprised of one horizontal row of macro blocks.

Storage capacity is eight slices because a vertical range of the motion compensation is eight slices at the maximum in the MPEG-1 standard.

The frame memory 206b stores the frame data preceding the frame currently decoded by the image signal decoding apparatus 200. If the predetermined frame data of the currently decoded frame is inputted from the FIFO-type memory 206a according to an instruction of the memory controller 206c, however, the frame memory 206b overwrites with the inputted frame data the forward reference frame data of the same in-frame address as that data.

The memory controller 206c outputs to the FIFO-type memory 206a the instruction signal for having the most previously stored data of one slice outputted to the frame memory 206b. In addition, the memory controller 206c outputs to the frame memory 206b the instruction signal for having the data of one slice inputted from the FIFO-type memory 206a written to the predetermined address.

At this time, the memory controller 206c has the inputted data overwritten with the same in-frame address in the forward reference frame stored in the frame memory 206b. To be more specific, in the frame memory 206b, the forward reference frame data is maintained as to the data of the addresses within eight slices of the frame data currently decoded in the image signal decoding apparatus 200, and the data of the addresses apart by nine or more slices is sequentially overwritten.

As for the above-mentioned image signal decoding apparatus having the FIFO-type memory, however, there may be the cases where the image based on the MPEG-4 standard has a motion compensation range covering the entire image so that the decoding process cannot be appropriately performed when the storage capacity of the FIFO-type memory is limited to eight slices.

SUMMARY OF THE INVENTION

An object of the present invention is to reduce the costs in the decoding of the digital image signals.

Figure 1:
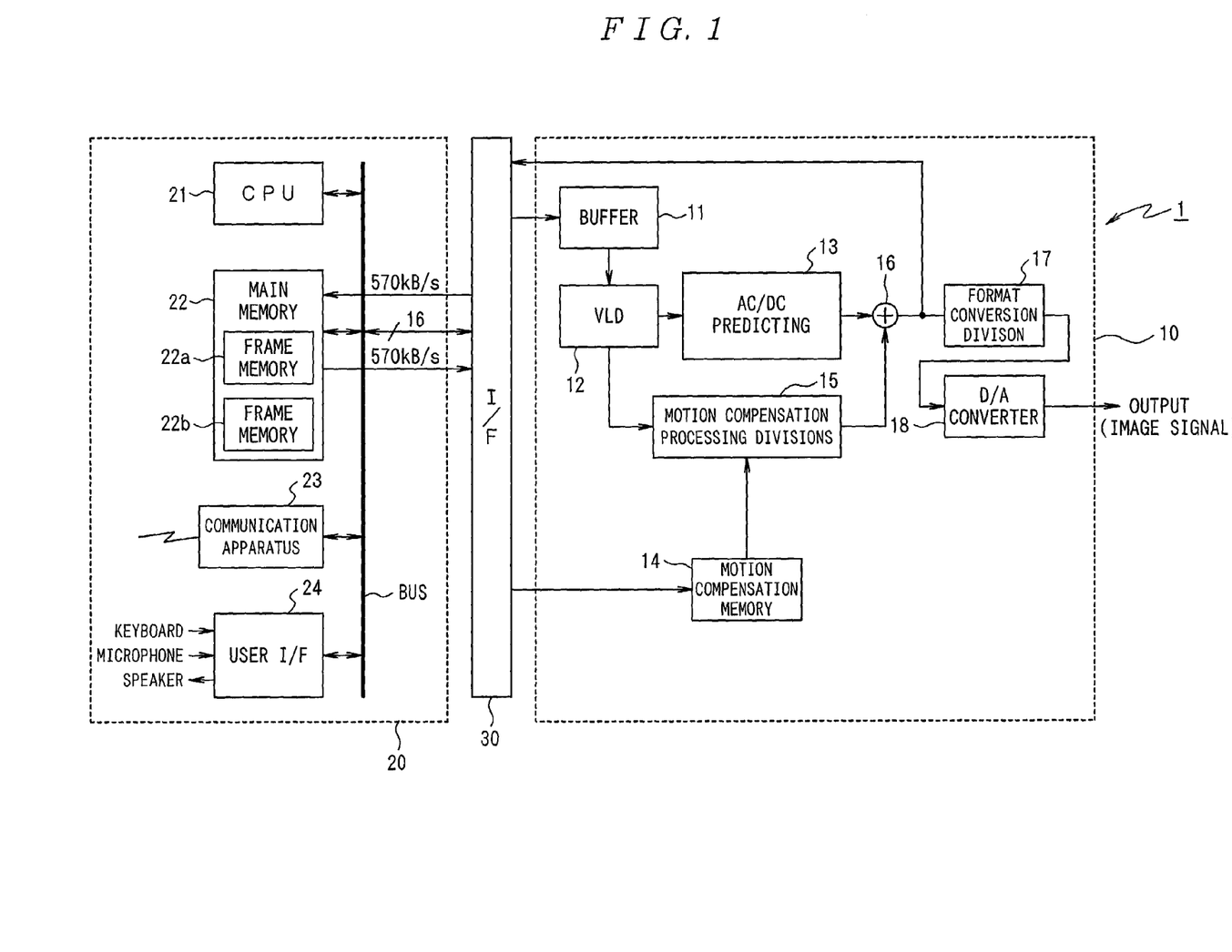
FIG. 1 is a diagram showing a configuration of an image signal decoding apparatus 1 in a first embodiment of the present invention.

To attain the above object, the invention according to claim 1 is an image signal decoding apparatus having a main storage division (a main memory 22 in FIG. 1 for instance) used for controlling the entire image signal decoding apparatus, a dedicated storage division (a motion compensation memory 14 in FIG. 1 for instance) used for an motion compensation process in decoding of an image signal, and a motion compensation processing division (a motion compensation division 15 in FIG. 1 for instance) for performing the motion compensation process to the image signal, wherein:

the above described main storage division has a frame storage division (frame memories 22a and 22b in FIG. 1 for instance) for storing frame data (frame data of a forward reference frame for instance) for performing the motion compensation process;

the above described dedicated storage division stores, of the frame data stored in the above described frame storage division, the frame data of a predetermined address highly likely to be referred to in the motion compensation process (a "peripheral address" in an embodiment of the invention for instance); and the above described motion compensation processing division performs the motion compensation process by referring to the frame data stored in the above described dedicated storage division.

BRIEF DESCRIPTION OF THE DRAWINGS

FIG. 5 is a diagram showing a relationship between a macro block of a current frame data to which a motion compensation process is performed and a macro block of a forward reference frame data to be referred to;

DETAILED DESCRIPTION OF THE PREFERRED EMBODIMENTS

Hereafter, the embodiments of the image signal decoding apparatus related to the present invention will be described in detail by referring to the drawings.

The image signal decoding apparatus related to the present invention receives a digital image signal encoded based on MPEG-4 and so on, and decodes the image signal by performing a decoding process including motion compensation and so on.

(First Embodiment)

First, its configuration will be described.

FIG. 1 is a diagram showing a configuration of an image signal decoding apparatus 1 in a first embodiment of the present invention.

In FIG. 1, the image signal decoding apparatus 1 includes and is comprised of a decoding processing division 10, a common division 20 and an interface (hereafter, I/F) 30 for performing a process involved in sending and receiving the signal between the decoding processing division 10 and the common division 20.

The decoding processing division 10 is configured to further include a buffer 11, a variable length decoding division (hereafter, referred to as "VLD") 12, a data conversion division 13, a motion compensation memory 14, a motion compensation processing division 15, an adder 16, a format conversion division 17 and a D/A converter 18.

Of the components of the decoding processing division 10, the configurations of the buffer 11, the VLD 12, the adder 16, the format conversion division 17 and the D/A converter 18 are the same as the corresponding portions of the image signal decoding apparatus 100 in the past, and so description thereof will be omitted. Moreover, the signal inputted to the buffer 11 is inputted via the I/F 30 from a communication apparatus 23 of the common division 20 mentioned later. Moreover, addition results of the adder 16 are outputted via the I/F to a frame memory 22a or a frame memory 22b of a main memory 22.

The data conversion division 13 is configured to include an AC/DC predicting division, an inverse quantization division and an inverse DCT division, and these components have the same functions as an AC/DC predicting division 103, an inverse quantization division 104 and an inverse DCT division 105 in the image signal decoding apparatus 100 in the past respectively. To be more specific, the data conversion division 13 predicts AC and DC components of the variable length decoded data inputted from the VLD 12 between or inside the frames, inversely quantizes it and performs inverse discrete cosine transform and outputs it to the adder 16.

Each time processing of one line (one horizontal alignment of macro blocks) is finished, the motion compensation memory 14 stores frame data of predetermined one line read from a frame memory in which forward reference frame data of a currently decoded frame is stored, of the frame memories 22a and 22b of the main memory 22 according to an instruction of the motion compensation processing division 15. And the motion compensation memory 14 outputs to the motion compensation processing division 15 the frame data to be used for the motion compensation process.

Figure 2:
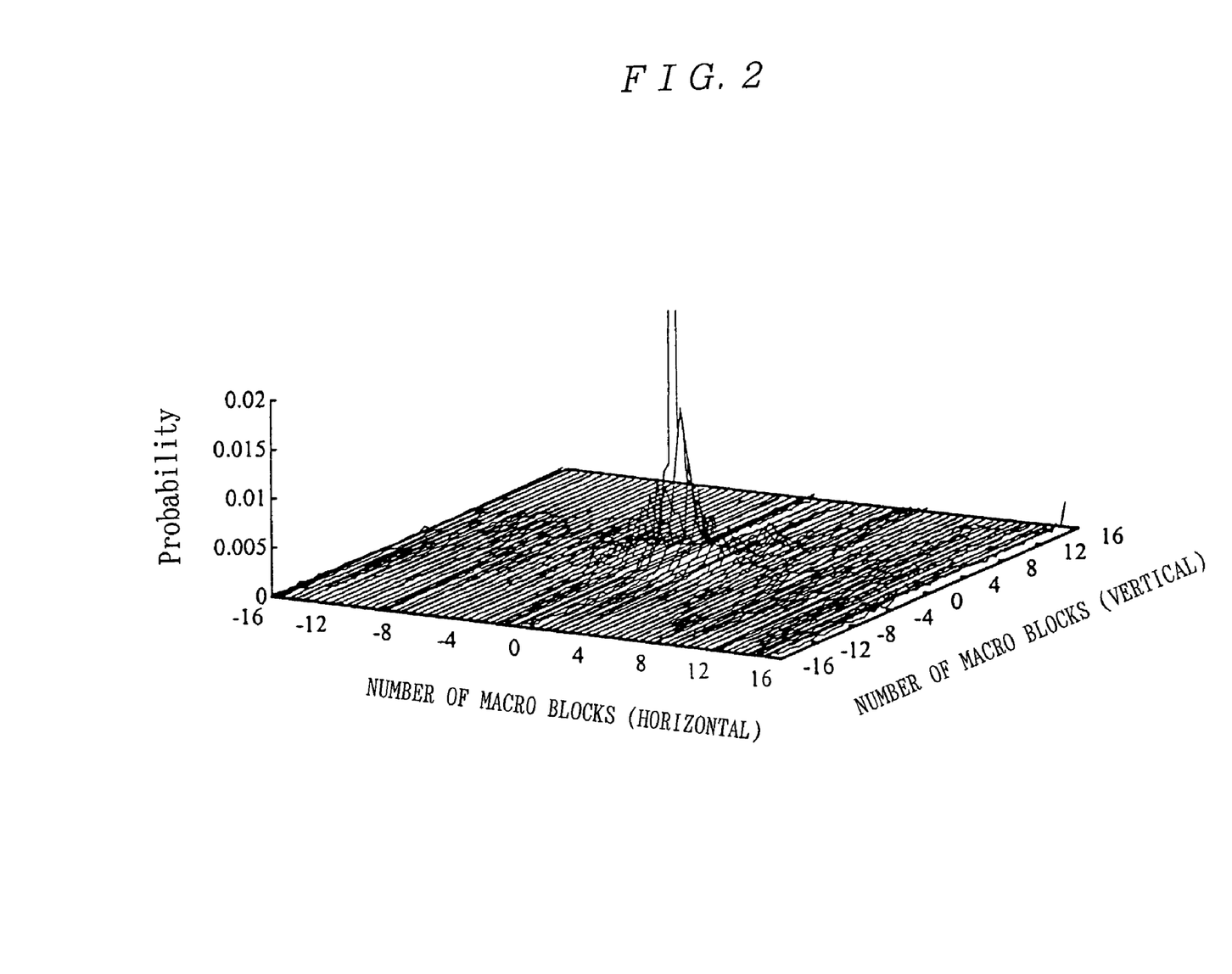
FIG. 2 is a diagram showing an example of motion vector distribution in various image sample data.

Here, the frame data stored in the motion compensation memory 14 will be described. The frame data stored in the motion compensation memory is the data included in an address (hereafter, referred to as a "peripheral address") in a predetermined range from the address corresponding to the currently decoded macro block in the forward reference frame data, and it is the data generally highly likely to be used in the motion compensation process. FIG. 2 is a diagram showing an example of motion vector distribution in various image sample data. In FIG. 2, the motion vectors are generally distributed in the range of plus or minus 16 lines in vertical and horizontal directions with high probability. Accordingly, the motion compensation memory 14 stores the data included in an address range equal to or wider than plus or minus 16 lines as the peripheral address, that is, in the address range of plus or minus 16 lines or plus or minus 32 lines for instance.

Moreover, in the case where the motion compensation process of one line is finished, the frame data of one line to be newly included in the peripheral address is temporarily stored in the motion compensation memory 14.

Returning to FIG. 1, the motion compensation processing division 15 performs the motion compensation process by the macro blocks based on the variable length decoding data inputted from the VLD 12 and the predetermined frame data inputted from the motion compensation memory 14, and outputs processing results to the adder 16.

Next, the common division 20 will be described.

The common division 20 is configured to further include a CPU (Central Processing Unit) 21, the main memory 22, the communication apparatus 23 and a user interface (hereafter, referred to as a "user I/F"). Moreover, these portions and the I/F 30 are connected by a bus respectively.

The CPU 21 controls the entire image signal decoding apparatus 1. In addition, the CPU 21 alternately switches the frame memories 22a and 22b as a storage destination of the current frame data each time the frame to be processed is changed. Furthermore, each time processing of the frame data of one line is finished, the CPU 21 has the predetermined frame data of one line of the forward reference frame data outputted to the motion compensation memory 14 from the frame memory 22a or 22b according to the instruction of the motion compensation processing division 15.

When the CPU 21 performs various processes, the main memory 22 forms a work area for temporarily storing the data on these processes. Moreover, the main memory 22 further includes and is comprised of the frame memories 22a and 22b. The frame memories 22a and 22b store the current frame data inputted from the adder 16 via the I/F 30 according to the instruction of the CPU 21 respectively. At this time, the frame memories 22a and 22b has the current frame data alternately stored therein frame by frame. Accordingly, one of the frame memories 22a and 22b has the current frame data stored therein, and the other has the forward reference frame data stored therein.

The communication apparatus 23 receives the image signal transmitted via a communication network.

A user I/F 24 performs signal processing for sending and receiving the signal between an input-output device such as a keyboard, microphone or a speaker and the image signal decoding apparatus 1.

Next, operations will be described.

The image signal received by the image signal decoding apparatus 1 is only encoded inside the frame as to the frame received first, and includes the data on the entire frame. As for the second frame and those thereafter, they are also encoded with the forward reference frames so that the data thus inter-frame encoded with the forward reference frame (motion vectors, residual components and so on) is transmitted.

And, the image signal decoding apparatus 1 stores the decoded frame data (forward reference frame data) in one of the frame memories 22a and 22b, and decodes the frame data of the currently received image (current frame data) while referring to the forward reference frame data.

Hereafter, it will be described by exemplifying a case where the forward reference frame data is stored in the frame memory 22a, and the current frame data is stored in the frame memory 22b.

In the image signal decoding apparatus 1, the image signal received by the communication apparatus 23 is inputted to the buffer 11 via the bus and the I/F 30.

Next, it is decoded in variable length by the VLD 12, and the motion compensation process is performed by the motion compensation processing division 15 by referring to the motion vector included in the received signal and the forward reference frame data. At this time, the motion compensation processing division 15 reads the data of the forward reference frame to be used for the motion compensation process from the motion compensation memory 14 to perform the process. Accordingly, it is possible to implement the motion compensation process at a high speed compared with the case of performing the motion compensation process by accessing the main memory 22 provided outside the decoding processing division 10.

Next, the data to which the motion compensation process was performed and the data processed by the data conversion division 13 are added by the adder 16 and then are converted into a predetermined data format by the format conversion division 17. In addition, the data added by the adder 16 is stored in the frame memory 22b storing the current frame data and is referred to as the forward reference frame data before the next frame is decoded.

And the data converted into the predetermined format is converted into an analog signal by the D/A converter 18 to have the image signal decoded.

As described above, the image signal decoding apparatus 1 in the first embodiment of the present invention stores the forward reference frame data to be used for the decoding process in the frame memories 22a and 22b of the main frame 22 provided to the common division 20, and also stores the frame data highly likely to be used for the motion compensation process in the motion compensation memory 14 provided to the decoding processing division 10.

Accordingly, it is possible, by sharing the main memory 22, to decrease manufacturing costs of the image signal decoding apparatus 1 compared with the cases of providing dedicated frame memories for storing the current frame data and the forward reference frame data inside the decoding processing division 10 respectively. In addition, it is possible to reduce power consumption during the decoding process compared with the cases of providing the dedicated frame memories.

(Second Embodiment)

Figure 3:
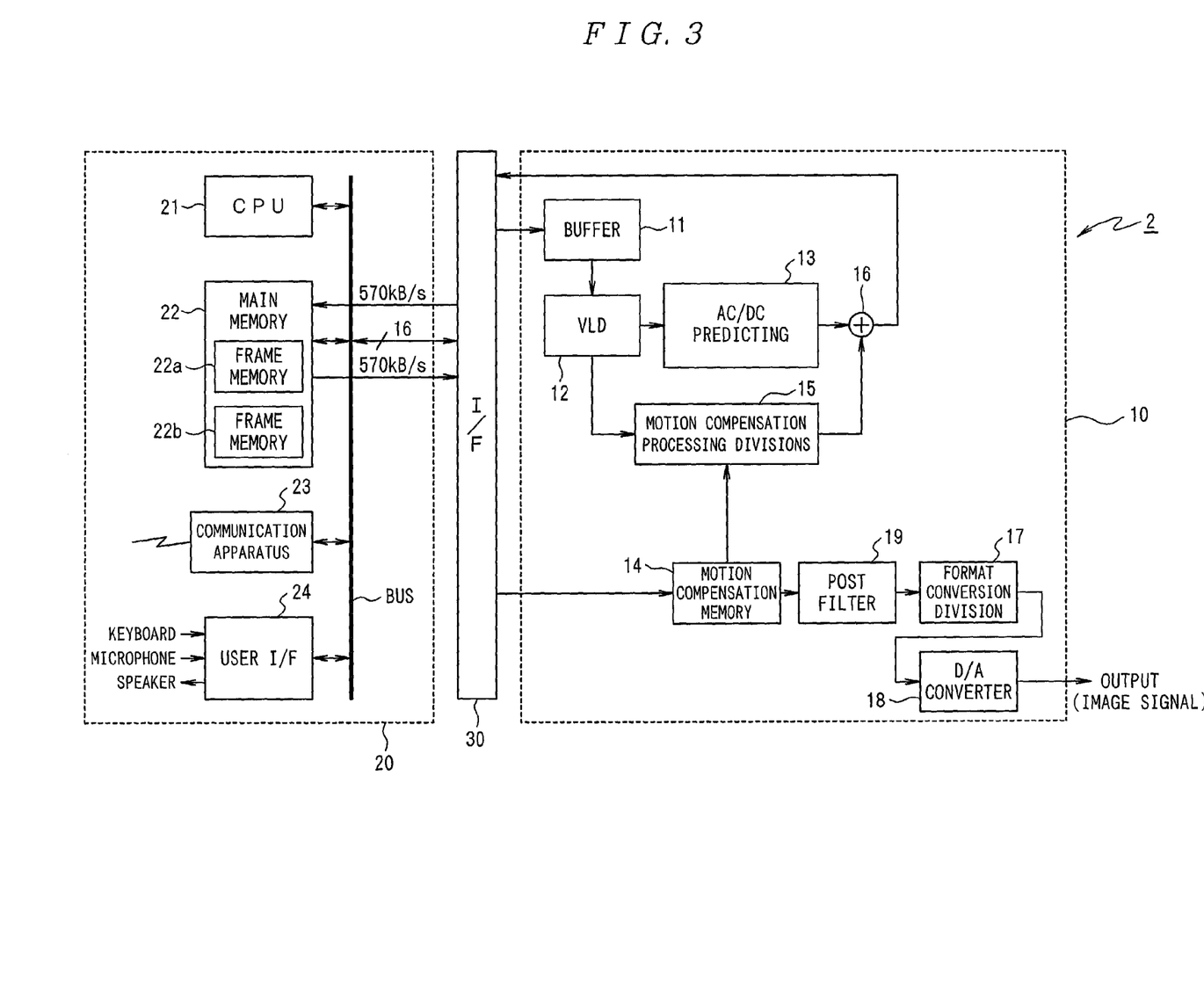
FIG. 3 is a diagram showing a configuration of an image signal decoding apparatus 2 in a second embodiment of the present invention.

FIG. 3 is a diagram showing a configuration of an image signal decoding apparatus 2 in a second embodiment of the present invention.

In FIG. 3, the image signal decoding apparatus 2 is configured to include the decoding processing division 10, the common division 20 and the I/F 30. Moreover, in the image signal decoding apparatus 2, the portions other than the motion compensation memory 14, the adder 16 and a post filter 19 of the decoding processing division 10 are common with the image signal decoding apparatus 1 so that they are numbered likewise and description thereof is omitted, and only the different portions will be described.

Each time the processing of one line is finished, the motion compensation memory 14 stores the frame data of predetermined one line read from the frame memory in which the forward reference frame data of the currently decoded frame is stored, of the frame memories 22a and 22b of the main memory 22 according to an instruction of the motion compensation processing division 15. And the motion compensation memory 14 outputs to the motion compensation processing division 15 the frame data to be used for the motion compensation process.

In addition, the motion compensation memory 14 sequentially outputs the stored frame data to the post filter 19. To be more specific, the motion compensation memory 14 outputs the forward reference frame data to the motion compensation processing division 15 in order to use it for the motion compensation process, and also outputs it to a processing system for rendering it as an output signal of the image signal decoding apparatus 2.

The adder 16 adds the data to which the motion compensation process was performed and the data processed by the data conversion division 13, and outputs the addition results via the I/F 30 to the frame memory 22a or the frame memory 22b of the main memory 22 storing the current frame data.

The post filter 19 performs the process for alleviating an inter-block distortion, a distortion caused by compression and so on of the forward reference frame data inputted from the motion compensation memory 14. To be more specific, the post filter 19 reduces the inter-block distortion, mosquito noise and so on, and generally performs a filtering process of nine taps or so. Thus, the post filter implemented at an early stage of the format conversion division 17 and the D/A converter 18 uses a line buffer of nine lines or so in total before and after the currently processed line. Here, as the motion compensation memory 14 constitutes the buffer of 48 lines or 80 lines, it is possible, by using this buffer to perform a post filter process, not only to perform efficient filter processing but also to decrease the costs required for the line buffer.

As described above, in the image signal decoding apparatus 2 according to this second embodiment, the forward reference frame data stored in the motion compensation memory 14 is outputted to the processing system (such as the post filter 19) for rendering it as an output signal of the image signal decoding apparatus 2. Accordingly, it is possible, when decoding the image signal, to decrease access frequency and speed up the decoding process compared with the case of separately accessing the main memory 22 to perform the post filter process. Moreover, it no longer requires a VRAM (Video Random Access Memory) for temporarily storing the image data when outputting the decoded image signal, so that it is possible to decrease the manufacturing costs of the image signal decoding apparatus 2.

(Third Embodiment)

Figure 4:
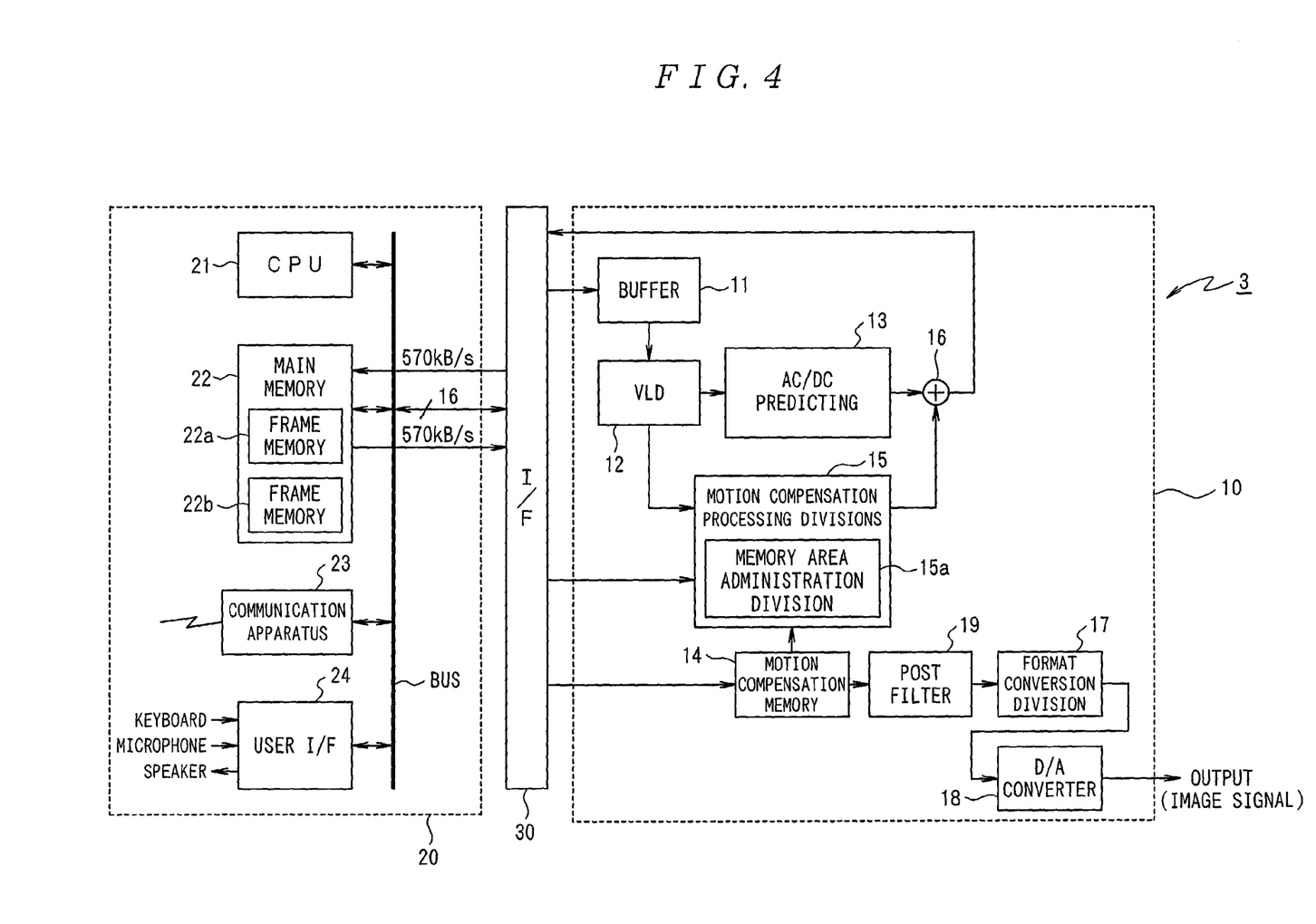
FIG. 4 is a diagram showing a configuration of an image signal decoding apparatus 3 in a third embodiment of the present invention.

FIG. 4 is a diagram showing a configuration of an image signal decoding apparatus 3 in a third embodiment of the present invention.

In FIG. 4, the image signal decoding apparatus 3 is configured to include the decoding processing division 10, the common division 20 and the I/F 30. Moreover, in the image signal decoding apparatus 3, the portions other than the motion compensation processing division 15 of the decoding processing division 10 and the CPU 21 of the common division 20 are common with the image signal decoding apparatus 2 so that they are numbered likewise and description thereof is omitted, and only the different portions will be described.

The motion compensation processing division 15 performs the motion compensation process by the macro blocks based on the variable length decoded data inputted from the VLD 12 and the predetermined frame data inputted from the motion compensation memory 14, and outputs the processing results to the adder 16.

Moreover, the motion compensation processing division 15 has a memory area administration division 15a. The memory area administration division 15a administers the address of the forward reference frame data stored in the motion compensation memory 14, and in the case where it determines that the forward reference frame data to be used for the motion compensation process is not stored in the motion compensation memory 14, it reads the forward reference frame data to be used for the motion compensation process from the frame memory 22a or the frame memory 22b of the main memory 22. On the other hand, in the case where it determines that the forward reference frame data to be used for the motion compensation process is stored in the motion compensation memory 14, the memory area administration division 15a reads the forward reference frame data to be used for the motion compensation process from the motion compensation memory 14.

Figure 5:
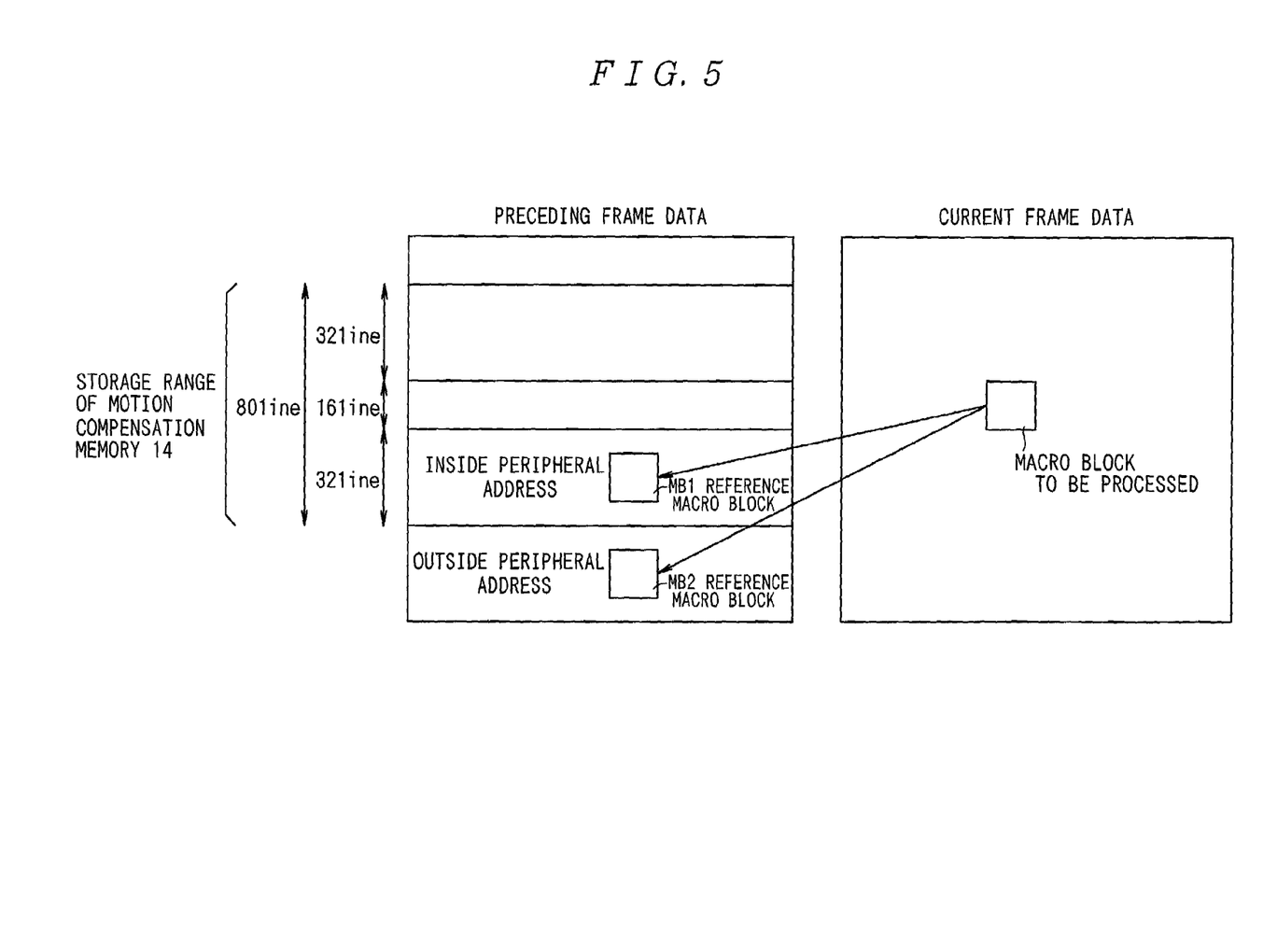

FIG. 5 is a diagram showing a relationship between the macro block of the current frame data to which the motion compensation process is performed and the macro block of the forward reference frame data to be referred to. In FIG. 5, of the forward reference frame data, the frame data of 16 lines to vertical 32 lines (peripheral address) including the macro block of the current frame data to which the motion compensation process is performed is stored in the motion compensation memory 14. And in the case where the motion compensation processing division 15 refers to a macro block MB1 included in the peripheral address, the memory area administration division 15a accesses the motion compensation memory 14 to read the macro block MB1. On the other hand, in the case where the motion compensation processing division 15 refers to a macro block MB2 not included in the peripheral address, the memory area administration division 15a accesses the main memory 22 to read the macro block MB2 from the frame memory 22a and 22b.

Returning to FIG. 4, the CPU 21 controls the entire image signal decoding apparatus 3. In addition, the CPU 21 alternately switches the frame memories 22a and 22b as the storage destination of the current frame data each time the frame to be processed is changed. Furthermore, each time the processing of the frame data of one line is finished, the CPU 21 has the predetermined frame data of one line of the forward reference frame data outputted to the motion compensation memory 14 from the frame memory 22a or 22b according to the instruction of the motion compensation processing division 15.

Moreover, in the case where the predetermined frame data to be used for the motion compensation process is read by the memory area administration division 15a, the CPU 21 has the data outputted from the frame memory 22a or the frame memory 22b to the motion compensation processing division 15.

As described above, in the case where the forward reference frame data required for the motion compensation process is not stored in the motion compensation memory 14, the image signal decoding apparatus 3 in the third embodiment of the present invention has the required forward reference frame data read from the frame memory 22a or the frame memory 22b of the main memory 22 by the memory area administration division 15a provided to the motion compensation processing division 15 so as to perform the motion compensation process. Accordingly, it is possible to perform the correct motion compensation process by reading the predetermined frame data as necessary from the main memory 22 while performing the motion compensation process at high speed with the frame data stored in the motion compensation memory 14.

(Fourth Embodiment)

Figure 6:
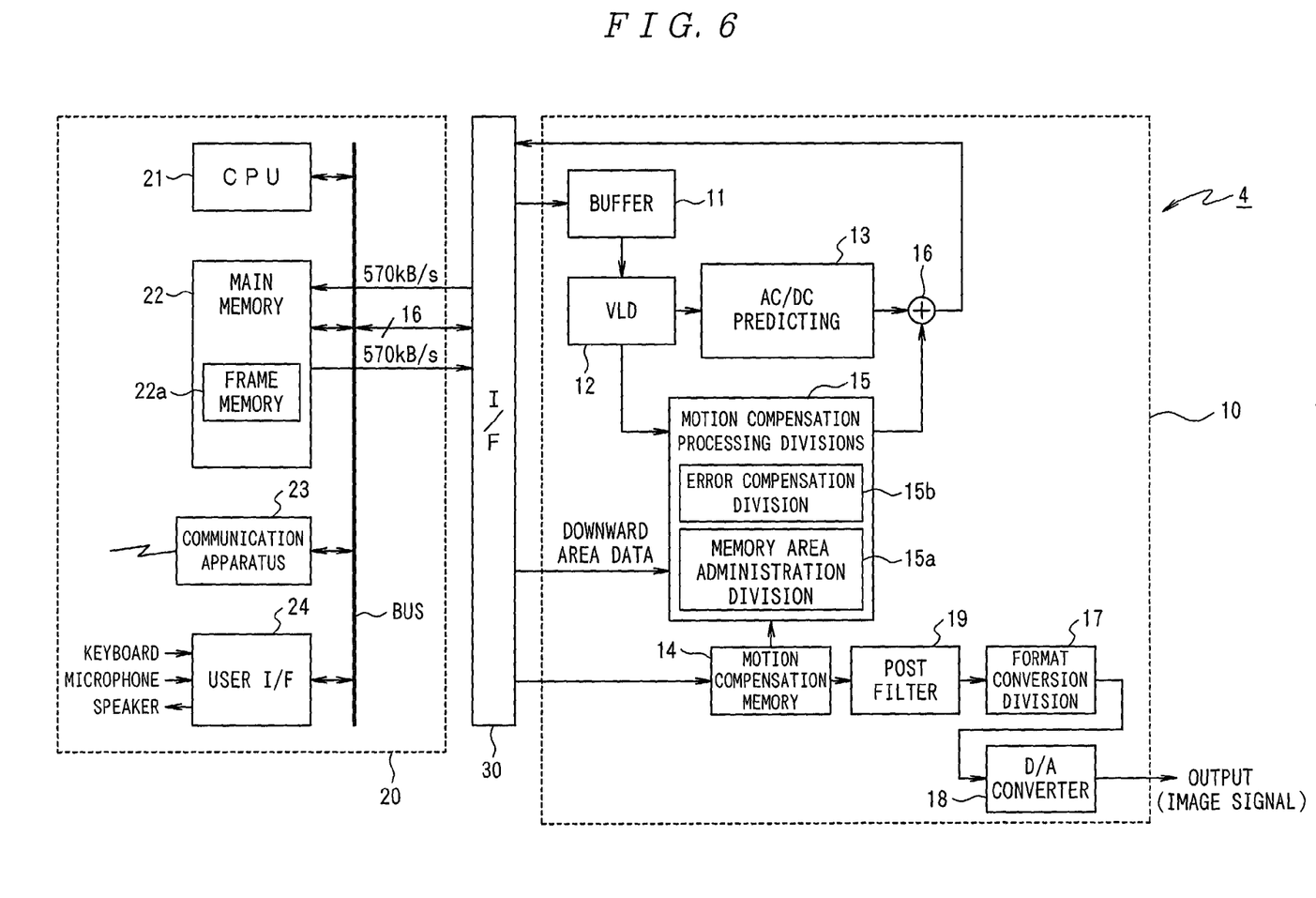
FIG. 6 is a diagram showing a configuration of an image signal decoding apparatus 4 in a fourth embodiment of the present invention.

FIG. 6 is a diagram showing a configuration of an image signal decoding apparatus 4 in a fourth embodiment of the present invention.

In FIG. 6, the image signal decoding apparatus 4 is configured to include the decoding processing division 10, the common division 20 and the I/F 30. Moreover, in the image signal decoding apparatus 4, the portions other than the motion compensation processing division 15 of the decoding processing division 10, the CPU 21 of the common division 20 and the main memory 22 are common with the image signal decoding apparatus 2 so that they are numbered likewise and description thereof is omitted, and only the different portions will be described.

The motion compensation processing division 15 performs the motion compensation process by the macro blocks based on the variable length decoded data inputted from the VLD 12 and the predetermined frame data inputted from the motion compensation memory 14, and outputs the processing results to the adder 16.

Moreover, the motion compensation processing division 15 has a memory area administration division 15a and an error compensation division 15b. The memory area administration division 15a administers the address of the frame data stored in the motion compensation memory 14, and in the case where it determines that the frame data to be used for the motion compensation process is stored in the motion compensation memory 14, it reads the forward reference frame data to be used therefor from the motion compensation memory 14. On the other hand, in the case where it is determined that the forward reference frame data to be used for the motion compensation process is not stored in the motion compensation memory 14, the memory area administration division 15a operates as follows.

In the case where the frame data to be used for the motion compensation process is retained in the frame memory 22a, the memory area administration division 15a reads that frame data (hereafter, referred to as "downward area data"), and in the case where that frame data is not retained in the frame memory 22a, that is, in the case where it is already overwritten with the current frame data, the memory area administration division 15a instructs the error compensation division 15b to perform an error compensation process specified in the MPEG-4.

For instance, in case of referring to the macro block MB1 in FIG. 5, the memory area administration division 15a reads the macro block MB1 from the motion compensation memory 14. On the other hand, in the case where the motion vector refers to the macro block MB2 (downward area data), the memory area administration division 15a reads the macro block MB2 since the forward reference frame data is retained in the macro block MB2. Furthermore, in the case where the motion vector refers to the macro block of a higher order address (the address that is overwritten with the current frame data and already out of the peripheral address) than the peripheral address, the forward reference frame data cannot be referred to, and so the memory area administration division 15a instructs the error compensation division 15b to perform the error compensation process specified in the MPEG-4.

In the case where it is not possible to refer to the forward reference frame data to be used for the motion compensation process, the error compensation division 15b performs the error compensation process specified in the MPEG-4.

Returning to FIG. 6, the CPU 21 controls the entire image signal decoding apparatus 4. In addition, if the current frame data is inputted from the adder 16, the CPU 21 stores that current frame data at the predetermined address of the frame memory 22a. Furthermore, each time the processing of the frame data of one line is finished, the CPU 21 has the predetermined frame data of one line of the forward reference frame data outputted to the motion compensation memory 14 from the frame memory 22a according to the instruction of the motion compensation processing division 15.

Moreover, in the case where the predetermined frame data to be used for the motion compensation process is read by the memory area administration division 15a, the CPU 21 has the data outputted from the frame memory 22a to the motion compensation processing division 15.

When the CPU 21 performs various processes, the main memory 22 forms a work area for temporarily storing the data on these processes. Moreover, the main memory 22 further includes and is comprised of the frame memories 22a. The frame memory 22a stores the current frame data inputted from the adder 16 via the I/F 30 according to the instruction of the CPU 21. At this time, the frame memory 22a has the stored forward reference frame data overwritten with the current frame data (the macro block) sequentially from the high order address. To be more specific, the frame memory 22a plays a role of storing the forward reference frame data and also a role of storing the decoded current frame data.

As described above, the image signal decoding apparatus 4 in the fourth embodiment has one frame memory 22a for storing the frame data in the main memory 22, and stores the forward reference frame data in this frame memory 22a, and overwrites with the decoded current frame data the forward reference frame data at its corresponding address. Accordingly, it is possible for the image signal decoding apparatus 4 to efficiently use the resources since just one frame memory needs to be provided in the main memory 22.

In addition, in the case where the frame data not stored in the motion compensation memory 14 is referred to, the image signal decoding apparatus 4 reads that data from the frame memory 22a when that frame data is not overwritten and is stored therein, and performs the motion compensation process by referring to it. Accordingly, it is possible, to have just one frame memory and perform the correct motion compensation process in the case where the forward reference frame data is not overwritten and is stored in the frame memory 22a.

(Fifth Embodiment)

Figure 7:
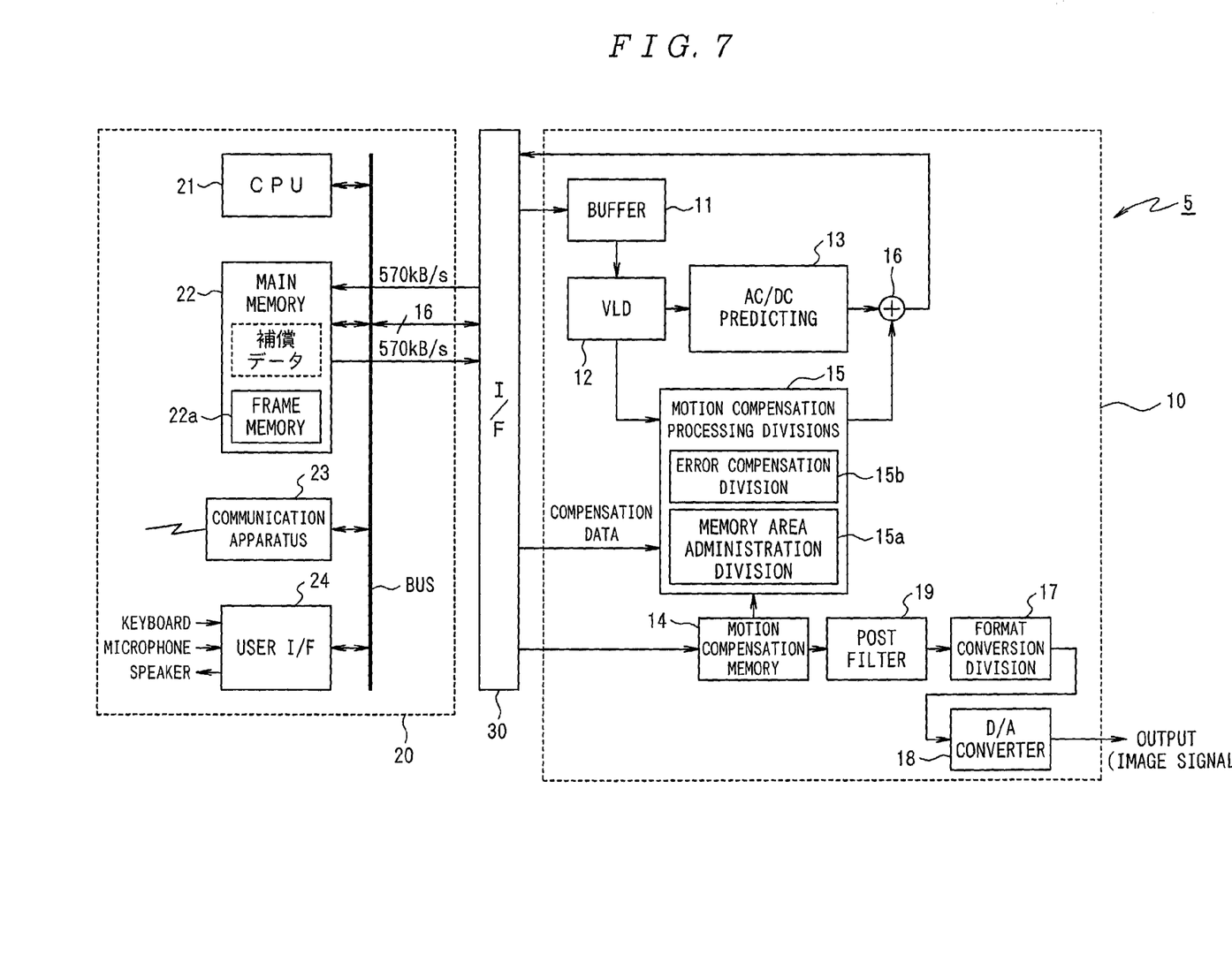
FIG. 7 is a diagram showing a configuration of an image signal decoding apparatus 5 in a fifth embodiment of the present invention.

FIG. 7 is a diagram showing a configuration of an image signal decoding apparatus 5 in a fifth embodiment of the present invention.

In FIG. 7, the image signal decoding apparatus 5 is configured to include the decoding processing division 10, the common division 20 and the I/F 30. Moreover, in the image signal decoding apparatus 5, the portions other than the motion compensation processing division 15 of the decoding processing division 10, the CPU 21 of the common division 20 and the main memory 22 are common with the image signal decoding apparatus 4 so that they are numbered likewise and description thereof is omitted, and only the different portions will be described.

The motion compensation processing division 15 performs the motion compensation process by the macro blocks based on the variable length decoded data inputted from the VLD 12 and the predetermined frame data inputted from the motion compensation memory 14, and outputs the processing results to the adder 16.

Moreover, the motion compensation processing division 15 has a memory area administration division 15a and an error compensation division 15b. The memory area administration division 15a administers the address of the frame data stored in the motion compensation memory 14, and in the case where it determines that the frame data to be used for the motion compensation process is stored in the motion compensation memory 14, it reads the forward reference frame data to be used therefor from the motion compensation memory 14. On the other hand, in the case where it is determined that the forward reference frame data to be used for the motion compensation process is not stored in the motion compensation memory 14, the memory area administration division 15a operates as follows.

In the case where the frame data to be used for the motion compensation process is retained in the frame memory 22a, the memory area administration division 15a reads that frame data, and in the case where that frame data to be used for the motion compensation process is not retained in the frame memory 22a, that is, in the case where it is already overwritten with the current frame data, the memory area administration division 15a reads the DC (Direct Current) component data of the forward reference frame data from the main memory 22 and instructs the error compensation division 15b to perform the error compensation process based on the DC component data of the forward reference frame data.

For instance, in the case of referring to the macro block MB1 in FIG. 5, the memory area administration division 15a reads the macro block MB1 from the motion compensation memory 14. On the other hand, in the case where the motion vector refers to the macro block MB2, the memory area administration division 15a reads the macro block MB2 since the forward reference frame data is retained in the macro block MB2. Furthermore, in the case where the motion vector refers to the macro block of a higher order address (the address that is overwritten with the current frame data and already out of the peripheral address) than the peripheral address, the forward reference frame data cannot be referred to, and so the memory area administration division 15a reads the DC component data of the forward reference frame data stored in the main memory 22 and instructs the error compensation division 15b to perform the error compensation process by using this data.

In the case where it is not possible to refer to the forward reference frame data to be used for the motion compensation process, the error compensation division 15b performs the error compensation process based on the DC component data of the forward reference frame data stored in the main memory 22. To be more specific, it performs the motion compensation process by referring to the DC component data of the forward reference frame data instead of the forward reference frame data to be referred to.

Returning to FIG. 7, the CPU 21 controls the entire image signal decoding apparatus 5. In addition, if the current frame data is inputted from the adder 16, the CPU 21 stores that current frame data at the predetermined address of the frame memory 22a. Furthermore, each time the processing of the frame data of one line is finished, the CPU 21 has the predetermined frame data of one line of the forward reference frame data outputted to the motion compensation memory 14 from the frame memory 22a according to the instruction of the motion compensation processing division 15.

In addition, in the case where the predetermined frame data to be used for the motion compensation process is read by the memory area administration division 15a, the CPU 21 has the data outputted from the frame memory 22a to the motion compensation processing division 15. Moreover, when the predetermined frame data to be used for the motion compensation process is read by the memory area administration division 15a, the CPU 21 has the DC component data of the forward reference frame data stored in the main memory 22 outputted to the motion compensation processing division 15 if that frame data is already overwritten and not retained in the frame memories 22a.

When the CPU 21 performs various processes, the main memory 22 forms a work area for temporarily storing the data on these processes. Moreover, the main memory 22 further includes and is comprised of the frame memories 22a. The frame memory 22a stores the current frame data inputted from the adder 16 via the I/F 30 according to the instruction of the CPU 21. At this time, the frame memory 22a has the stored forward reference frame data overwritten with the current frame data (the macro block) sequentially from the high order address. To be more specific, the frame memory 22a plays a role of storing the forward reference frame data and also a role of storing the decoded current frame data.

Figure 8:
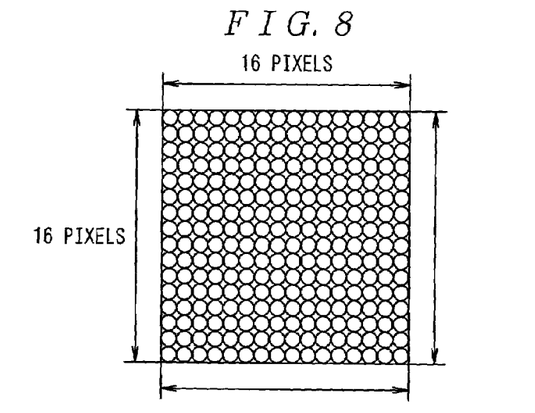
FIG. 8 is an image drawing showing a pixel configuration of the frame data.
Figure 9:
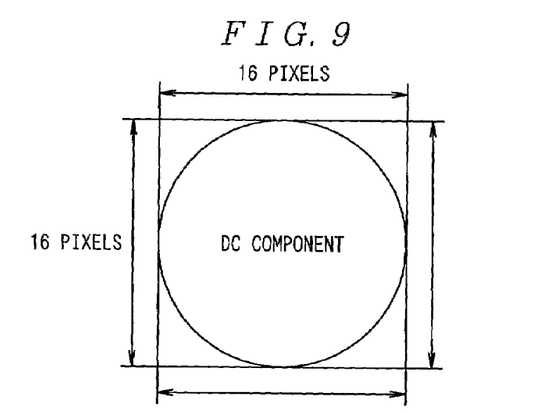
FIG. 9 is an image drawing of a DC component frame of which entire data in the frame data is comprised of the DC component.

Furthermore, the main memory 22 stores the DC component data of the forward reference frame data as error compensation data to be used for the error compensation process. And in the case where the memory area administration division 15a reads this DC component data, the data is outputted to the motion compensation processing division 15. Here, the DC component data is the data obtained by averaging all pixels included in the frame data shown in FIG. 8. FIG. 9 shows an image of a DC component frame, where all the data in the frame data is comprised of the DC components.

As described above, the image signal decoding apparatus 5 in the fifth embodiment has one frame memory 22a for storing the frame data in the main memory 22, and stores the forward reference frame data in this frame memory 22a, and overwrites with the decoded current frame data the forward reference frame data at its corresponding address. Accordingly, it is possible for the image signal decoding apparatus 5 to efficiently use the resources since just one frame memory needs to be provided in the main memory 22.

In addition, in the case where the frame data not stored in the motion compensation memory 14 needs to be referred to, the image signal decoding apparatus 5 reads that data from the frame memory 22a when that frame data is not overwritten and is stored therein, and performs the motion compensation process by referring to it. Accordingly, it is possible to have just one frame memory and perform the correct motion compensation process in the case where the forward reference frame data is not overwritten and is stored in the frame memory 22a.

Furthermore, in the case where the forward reference frame data not stored in the motion compensation memory 14 and the frame memory 22a needs to be referred to, the image signal decoding apparatus 5 performs the error compensation process based on the error compensation data (the DC component data of the forward reference frame data). Accordingly, the data to be referred to in the case of performing the error compensation process becomes closer to the forward reference frame data, so that it is possible to perform the error compensation process more correctly.

Figure 10:
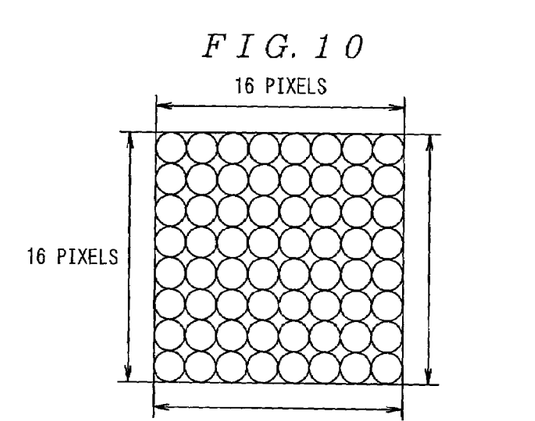
FIG. 10 is an image drawing of a sub-sample frame comprised of the data averaged by 2×2=4 pixels as a unit.

In addition, while the DC component data of the forward reference frame data is used as the error compensation data in this embodiment, it is also feasible to perform the error compensation process by using sub-sample data instead of the DC component data. Here, the sub-sample data is the data obtained by averaging the pixels included in the forward reference frame data by a fixed number of pixels as shown in FIG. 10. Moreover, FIG. 10 shows an image of a sub-sample frame comprised of the data averaged in the unit of 2×2=4 pixels.

According to the inventions according to claims 1 to 3, the frame data used for the motion compensation process is stored in a main storage division, and only the frame data of the address highly likely to be referred to, of the frame data stored in the main storage division, is stored in the dedicated storage division. Thus, it is possible to decrease the manufacturing costs compared with the cases of having a dedicated memory for storing the entire frame data. In addition, it is possible to reduce the power consumption during the decoding process.

According to the invention according to claim 4, an access is made to the frame storage division at every 16 lines, that is, at every breakpoint of a series of motion compensation processes. Thus, it is possible to efficiently read the frame data and reduce the power consumption required for reading compared with the cases of making accesses at random.

According to the inventions according to claims 5 and 6, it is possible to reduce the number of times to access the main storage division so that the decoding process can be performed at a high speed compared with the cases where the motion compensation processing division reads the frame data from the main storage division for the motion compensation process and the continuous decoding division separately reads the data to be processed from the main storage division. In addition, it is not necessary to provide a dedicated storage device for temporarily storing the data to output the decoded image signal so that it is possible to decrease the manufacturing costs.

According to the invention according to claim 7, in the case where the frame data to be referred to is not stored in the dedicated storage division, the frame data is read from the frame storage division to perform the motion compensation process. Accordingly, it is possible to perform the correct motion compensation process even in the case where the frame data to be referred to is not stored in the dedicated storage division.

According to the invention according to claim 8, as the frame data of two frames is stored in the frame storage division provided to the main storage division having relatively sufficient storage capacity, it is possible to efficiently use the resources and reduce the capacity of the dedicated storage division. Moreover, as the processing results outputted by the motion compensation processing division and the frame data for performing the motion compensation process are separately stored, it is always possible to refer to the frame data for performing the motion compensation process so that the correct motion compensation process can be performed.

According to the invention according to claim 9, it is possible to efficiently use the resources since just one frame storage division needs to be provided to the main storage division.

According to the invention according to claim 10, it is possible to perform the correct motion compensation process by using the frame data that is not overwritten and is stored in the frame storage division.

According to the invention according to claim 11, it is possible to decode the image signal by taking certain measures even in the case where the frame data necessary to be referred to is not stored.

According to the invention according to claim 12, it is possible to perform the more correct motion compensation process based on the DC component data of the forward reference frame even in the case where the motion compensation processing division needs to refer to the frame data not stored in the frame storage division.

According to the invention according to claim 13, it is possible to perform the more correct motion compensation process based on the sub-sample data of the forward reference frame even in the case where the motion compensation processing division needs to refer to the frame data not stored in the frame storage division.

What is claimed is:
1. An image signal decoding apparatus comprising:
a main storage division used for controlling the entire image signal decoding apparatus, which has a frame storage division for storing frame data for performing the motion compensation process; and
a decoding processing division for performing a decoding process including motion compensation, which has a dedicated storage division used for a motion compensation process in decoding of an image signal, and a motion compensation processing division for performing the motion compensation process to the image signal, and wherein said dedicated storage division stores, of the frame data stored in said frame storage division, the frame data of a predetermined address highly likely to be referred to in the motion compensation process; and said motion compensation processing division performs the motion compensation process by referring to the frame data stored in said dedicated storage division, and wherein said frame storage division stores the frame data of one frame and overwrites the processing results outputted by said motion compensation processing division to the corresponding address of the stored frame data, and wherein, in the case where said motion compensation processing division needs to refer to the frame data not stored in the frame storage division, said address administration division has a predetermined error compensation process that is defined performed.

2. An image signal decoding apparatus comprising:

a main storage division used for controlling the entire image signal decoding apparatus, which has a frame storage division for storing frame data for performing the motion compensation process; and a decoding processing division for performing a decoding process including motion compensation, which has a dedicated storage division used for a motion compensation process in decoding of an image signal, and a motion compensation processing division for performing the motion compensation process to the image signal, and wherein said dedicated storage division stores, of the frame data stored in said frame storage division, the frame data of a predetermined address highly likely to be referred to in the motion compensation process; and said motion compensation processing division performs the motion compensation process by referring to the frame data stored in said dedicated storage division, and wherein said frame storage division stores the frame date of one frame and overwrites the processing results outputted by said motion compensation processing division to the corresponding address of the stored frame data, and wherein said main storage division stores DC (Direct Current) component data of the frame data of a forward reference frame referred to for the motion compensation process, and in the case where said motion compensation processing division needs to refer to the frame data stored in the frame storage division, said address administration division has the frame data referred to, and has the error compensation process performed by referring to said DC component data in the case where said motion compensation processing division needs to refer to the frame data not stored in the frame storage division.

3. An image signal decoding apparatus comprising:

a main storage division used for controlling the entire image signal decoding apparatus, which has a frame storage division for storing frame data for performing the motion compensation process; and a decoding processing division for performing a decoding process including motion compensation, which has a dedicated storage division used for a motion compensation process in decoding of an image signal, and a motion compensation processing division for performing the motion compensation process to the image signal, and wherein said dedicated storage division stores, of the frame data stored in said frame storage division, the frame data of a predetermined address highly like to be referred to in the motion compensation process; and said motion compensation processing division performs the motion compensation process by referring to the frame data stored in said dedicated storage division, and wherein said frame storage division stores the frame data of one frame and overwrites the processing results outputted by said motion compensation processing division to the corresponding address of the stored frame data, and wherein said main storage division stores sub-sample data generated from the frame data of the forward reference frame referred for the motion compensation process, and in the case where said motion compensation processing division needs to refer to the frame data stored in the frame storage division, said address administration division has the frame data referred to, and has the error compensation process performed by referring to said sub-sample data in the case where said motion compensation processing division needs to refer to the frame data not stored in the frame storage division.

* * * * *